US008257636B2

(12) United States Patent
Oconnell et al.

(10) Patent No.: US 8,257,636 B2
(45) Date of Patent: Sep. 4, 2012

(54) METHOD FOR REFORMING A PORTION OF A PLASTIC CONTAINER TO INCLUDE A TRANSFERABLE ELEMENT, AND THE RESULTING CONTAINER

(75) Inventors: Patrick Matthew Oconnell, Hershey, PA (US); Brian J. Chisholm, York, PA (US)

(73) Assignee: Graham Packaging Company, L.P., York, NY (US)

( * ) Notice: Subject to any disclaimer, the term of this patent is extended or adjusted under 35 U.S.C. 154(b) by 0 days.

(21) Appl. No.: 12/556,709

(22) Filed: Sep. 10, 2009

(65) Prior Publication Data
US 2010/0000959 A1    Jan. 7, 2010

Related U.S. Application Data

(60) Division of application No. 11/350,835, filed on Feb. 10, 2006, now Pat. No. 7,637,733, which is a continuation-in-part of application No. 11/001,137, filed on Dec. 2, 2004, now abandoned.

(51) Int. Cl.
*B29C 59/02* (2006.01)
(52) U.S. Cl. .................. 264/339; 264/296; 264/327
(58) Field of Classification Search .......... 264/296, 264/327, 339, 509, 516
See application file for complete search history.

(56) References Cited

U.S. PATENT DOCUMENTS

| 2,266,417 A | 12/1941 | Eisler |
| 2,454,910 A | 11/1948 | Carr |
| 2,475,915 A | 7/1949 | Orr |
| 3,173,174 A | 3/1965 | Edwards |
| 3,195,450 A | 7/1965 | Sciame |
| 3,354,509 A | 11/1967 | Ammondsom |
| 3,418,409 A | 12/1968 | Hesse et al. |
| 3,432,586 A | 3/1969 | Stenger |
| 3,456,290 A | 7/1969 | Ruekberg |
| 3,457,590 A | 7/1969 | Dittmann |
| 3,464,582 A | 9/1969 | Greitzer et al. |
| 3,540,371 A | 11/1970 | Rudolph et al. |

(Continued)

FOREIGN PATENT DOCUMENTS
EP    0057504 A1    8/1982
(Continued)

OTHER PUBLICATIONS

International Search Report dated Jul. 31, 2007 from corresponding PCT Application No. PCT/US2007/003467.
(Continued)

*Primary Examiner* — Robert B Davis
(74) *Attorney, Agent, or Firm* — Stradley Ronon Stevens & Young, LLP

(57) ABSTRACT

A method and apparatus for reforming a portion of a blow molded plastic container includes directing energy from a heater onto the portion of the container so as to heat the portion while leaving the remainder of the container relatively unheated. The heated portion of the container is then engaged by a reforming tool having an embossed or imprinted characteristic on a contact surface of the reforming tool so as to reform the portion of the container and form a three-dimensional feature thereon which is not reproducible without using the method and/or apparatus of the present invention. Alternatively, the heated portion of the container is engaged by a reforming tool having a transferable element on a contact surface of the reforming tool so as to reform the portion of the container and transfer the transferable element to the portion of the container.

17 Claims, 8 Drawing Sheets

U.S. PATENT DOCUMENTS

| | | | |
|---|---|---|---|
| 3,790,087 | A | 2/1974 | Banyas et al. |
| 3,846,531 | A | 11/1974 | Reilly |
| 3,862,698 | A | 1/1975 | Hafele |
| 3,874,830 | A | 4/1975 | Carter et al. |
| 3,947,204 | A | 3/1976 | Ayres et al. |
| 3,969,455 | A | 7/1976 | Moller |
| 4,034,036 | A | 7/1977 | Farrell |
| 4,051,754 | A | 10/1977 | Harcuba et al. |
| 4,061,702 | A | 12/1977 | Kessler |
| 4,103,411 | A | 8/1978 | Gottsegen |
| 4,151,024 | A | 4/1979 | Ohlsson |
| 4,179,252 | A | 12/1979 | Seufert |
| 4,297,306 | A | 10/1981 | Yoshino et al. |
| 4,323,411 | A | 4/1982 | Uhlig |
| 4,324,601 | A | 4/1982 | Dembicki et al. |
| 4,379,099 | A | 4/1983 | Ota et al. |
| 4,450,765 | A | 5/1984 | Van Steenkiste |
| 4,497,622 | A | 2/1985 | Grebowiec |
| 4,497,758 | A | 2/1985 | Clark |
| 4,522,770 | A | 6/1985 | Andersen |
| 4,650,628 | A | 3/1987 | Evely |
| 4,696,636 | A | 9/1987 | Evely |
| 4,701,295 | A | 10/1987 | Kato et al. |
| 4,717,522 | A | 1/1988 | Evely |
| 4,717,523 | A | 1/1988 | Evely |
| 4,856,667 | A | 8/1989 | Thompson |
| 4,928,835 | A | 5/1990 | Collette et al. |
| 4,954,310 | A | 9/1990 | Andersen |
| 4,968,242 | A | 11/1990 | Andersen |
| 5,045,255 | A | 9/1991 | Kurz |
| 5,067,888 | A | 11/1991 | Torsten |
| 5,115,938 | A | 5/1992 | Thompson |
| 5,200,587 | A | 4/1993 | Fang |
| 5,215,694 | A | 6/1993 | Bartimes et al. |
| 5,238,642 | A | 8/1993 | Benquet et al. |
| 5,259,858 | A | 11/1993 | Inao et al. |
| 5,429,777 | A | 7/1995 | Nilsson |
| 5,431,291 | A | 7/1995 | LaBombarbe, Jr. |
| 5,441,675 | A | 8/1995 | Souders |
| 5,467,628 | A | 11/1995 | Bowlin et al. |
| 5,582,957 | A | 12/1996 | Sirianni et al. |
| 5,807,592 | A | 9/1998 | Alieri |
| 5,827,467 | A | 10/1998 | Ruppert et al. |
| 5,879,723 | A | 3/1999 | Stachowiak |
| 5,980,811 | A | 11/1999 | Towns |
| 5,989,665 | A | 11/1999 | Connell et al. |
| 6,003,699 | A | 12/1999 | Laszlo et al. |
| 6,062,408 | A | 5/2000 | Beck et al. |
| 6,113,840 | A | 9/2000 | Emmer et al. |
| 6,126,886 | A | 10/2000 | Beck et al. |
| 6,187,399 | B1 | 2/2001 | Sandor et al. |
| 6,237,791 | B1 | 5/2001 | Beck et al. |
| 6,241,111 | B1 | 6/2001 | Sandor et al. |
| 6,315,967 | B1 | 11/2001 | Potter et al. |
| 6,361,640 | B1 | 3/2002 | Kamen et al. |
| 6,361,842 | B1 | 3/2002 | Stachowiak |
| 6,434,812 | B1 | 8/2002 | Andersson et al. |
| 6,530,301 | B1 | 3/2003 | Seitz et al. |
| 6,536,616 | B2 | 3/2003 | Sandor et al. |
| 6,555,033 | B2 | 4/2003 | Cargile et al. |
| 6,629,834 | B2 | 10/2003 | Cargile et al. |
| 6,675,680 | B1 | 1/2004 | Seitz et al. |
| 6,789,398 | B1 | 9/2004 | Daoud et al. |
| 6,855,289 | B2 | 2/2005 | Krishnakumar et al. |
| 7,147,451 | B2 | 12/2006 | Johnson |
| 7,435,073 | B2 | 10/2008 | Chisholm et al. |
| 7,537,303 | B2 | 5/2009 | Arazaki |
| 7,637,733 | B2 | 12/2009 | O'Connell et al. |
| 2002/0043512 | A1 | 4/2002 | Sandor et al. |
| 2003/0042649 | A1 | 3/2003 | Bernard |
| 2003/0098526 | A1 | 5/2003 | Krishnakumar et al. |
| 2005/0068182 | A1 | 3/2005 | Dunlap et al. |
| 2005/0269744 | A1 | 12/2005 | Lonsway |
| 2005/0280542 | A1 | 12/2005 | Shieh |
| 2006/0033230 | A1 | 2/2006 | Chisholm et al. |
| 2006/0119004 | A1 | 6/2006 | Chmura et al. |
| 2007/0126152 | A1 | 6/2007 | Chisholm |
| 2007/0139202 | A1 | 6/2007 | Austin |
| 2008/0054524 | A1 | 3/2008 | Chisholm et al. |
| 2008/0054526 | A1 | 3/2008 | Barker et al. |
| 2010/0252952 | A1 | 10/2010 | Pennington |
| 2011/0315592 | A1 | 12/2011 | Pennington et al. |

FOREIGN PATENT DOCUMENTS

| | | |
|---|---|---|
| EP | 0381322 | 8/1990 |
| EP | 1230905 | 8/2002 |
| GB | 1010603 | 11/1965 |
| GB | 1346681 | 2/1974 |
| GB | 2015914 | 9/1979 |
| GB | 2092567 | 8/1982 |
| GB | 2187129 | 9/1987 |
| JP | 61-116513 | 6/1986 |
| JP | 2001-138388 | 5/2001 |
| NL | 8203001 | 7/1983 |
| NL | 8901766 | 2/1991 |
| WO | WO2006/020761 | 2/2006 |
| WO | WO2006/060350 A2 | 6/2006 |
| WO | WO2006/060350 A3 | 6/2006 |
| WO | WO2007095085 A1 | 8/2007 |
| WO | WO2008027729 A2 | 3/2008 |
| WO | WO2010118014 A2 | 10/2010 |

OTHER PUBLICATIONS

Patent Abstracts of Japan vol. 2000, No. 22, Mar. 9, 2001 (JP 2001 138 388 A Kuroda Plastic Kogyo KK May 22, 2001).
Blow Molding Handbook, Edited by Donald V. Rosato, PhD and Dominick V. Rosato PE, 1989, pp. 7, 8, 15 and 34.
EPO International Search Report mailed Dec. 6, 2010 for International Application No. PCT/US2010/030082.
Fundamentals of Manufacturing, 2nd Edition, Society of Manufacturing Engineers, 2002, p. 230.
PCT/US2005/028538—International Search Report and Written Opinion mailed Dec. 15, 2005.
PCT/US2005/043022—International Preliminary Report on Patentability issued Jun. 5, 2007.
PCT/US2005/043022—International Search Report and Written Opinion mailed May 4, 2006.
PCT/US2005028538—International Preliminary Report on Patentability issued Jul. 5, 2006.
PCT/US2007/003467 International Preliminary Report on Patentability issued Aug. 12, 2008.
PCT/US2007/003467 International Search Report and Written Opinion issued Jul. 31, 2007.
PCT/US2007/076060—International Preliminary Report on Patentability issued Mar. 3, 2009.
PCT/US2007/076060—International Search Report and Written Opinion mailed Oct. 3, 2008.
PCT/US2010/030082—International Preliminary Report on Patentability issued Oct. 11, 2011.
Plastics Processing Technology, Edward A. Muccio, 1994, pp. 124-125.
Understanding Blow Molding 2nd Edition, Norman C. Lee, 2007, pp. 13 and 34.

METHOD FOR REFORMING A PORTION OF A PLASTIC CONTAINER TO INCLUDE A TRANSFERABLE ELEMENT, AND THE RESULTING CONTAINER

CROSS REFERENCE TO RELATED APPLICATIONS

This application is a divisional of co-pending U.S. patent application Ser. No. 11/350,835 filed on Feb. 10, 2006, which is a Continuation-In-Part of U.S. patent application Ser. No. 11/001,137, filed on Dec. 2, 2004, the disclosure of which is incorporated herein by reference.

BACKGROUND OF THE INVENTION

The present invention generally relates to a method and apparatus for reforming a portion of an extrusion blow molded plastic container after molding and trimming, and more particularly to adding a three-dimensional feature or transferable element during the reforming of a portion of an extrusion blow molded plastic container after molding and trimming.

The process of extrusion blow molding plastic containers typically involves the steps of extruding a tube of monolayer or multilayer plastic material, capturing the tube between opposed mold sections, blowing the tube to the contours of the mold cavity, opening the mold, removing the container, and trimming the end of the container neck finish. This trimming operation can involve removal of a flash or moil from the neck finish. The trimmed material may be scrapped or, alternatively, recycled as process regrind. In another exemplary extrusion blow molding operation, the trimming operation can involve separation of two containers that are molded end-to-end. In either case, the trimming operation can leave an uneven end surface for later sealing engagement with a container closure. Furthermore, the end surface of the container neck finish may have mold parting line seams that can deleteriously affect sealing engagement with a container closure. These uneven or inconsistent end surface features can also affect induction sealing. Induction sealing can typically involve induction welding a metallic liner disk to a container end surface after filling the container to obtain a satisfactory container seal.

In order to correct these unwanted features, it has been proposed to burnish the end surface of the container neck finish by contacting the neck finish end surface with a heated burnishing tool. Upon contacting the container neck finish end surface, the tool simultaneously heats the end portion of the neck finish to a particular softening temperature of the plastic material and modifies the end surface to eliminate mold parting line seams, uneven trim portions and other post-molding imperfections. This process, however, has certain disadvantages. For example, the heated plastic of the container neck finish may tend to stick to the heated burnishing tool. It is also difficult to control the temperature of the burnishing tool so as to obtain a desired temperature at the burnishing surface of the tool. Moreover, effective burnishing often requires that one of the bottle or the burnishing tool be rotated relative to the other to achieve a desired effect. This introduces additional process variables and, consequently, affects production speed. Thus, the tendency of the heated plastic to stick to the burnishing tool, in combination with the oft-required rotational step and difficulty of controlling the burnishing surface temperature of the tool, makes it difficult to determine and control the optimum tool-to-surface contact time (i.e., dwell time). The dwell time, during which the burnishing tool is in contact with the end portion of the neck finish, as well as additional process variables, should be minimized to achieve desired production speeds.

Additionally, there is no known technique for adding unique three-dimensional features during modification of a molded and trimmed portion of a container to provide a means for detecting counterfeit containers and/or to alter the aesthetic appearance of the container. Likewise, there is no known technique for adding a transferable element to a container during modification of a molded and trimmed portion of a container. Such a transferable element can serve to alter the aesthetic appearance of the container. It can also provide a means for detecting counterfeit containers and/or allow more effective and efficient tracking of the respective container. In the past, tracking of individual containers was generally performed by way of a unique bar code identifier symbol printed on a label attached to a respective container. Tracking using bar coded labels, however, can require specific container orientation for proper scanning which introduces additional process variables.

SUMMARY OF THE INVENTION

In an exemplary embodiment of the present invention, a method and apparatus are provided for reforming a portion of a blow molded plastic container such as, for example, a neck finish end surface of the container, after molding, to prepare the end surface for enhanced sealing engagement with a closure. The method and apparatus of the present invention involve reforming a portion of a container, such as, for example, a neck finish end sealing surface, to eliminate manufacturing imperfections thereon while simultaneously creating three-dimensional features on the portion of the container that can, for example, add to the aesthetic appearance or aid in identifying counterfeit containers employing the method and/or the apparatus of the present invention. Alternatively, the method and apparatus of the present invention involve reforming a portion of a container, such as, for example, a neck finish end sealing surface, to eliminate manufacturing imperfections thereon while simultaneously transferring elements into or onto the portion of the container to alter the aesthetic appearance of the container or aid in tracking the container and identifying counterfeit containers employing the method and/or the apparatus of the present invention.

A method of reforming a portion of a plastic container such as, for example, the neck finish end portion and sealing surface of a blow molded plastic container, in accordance with one aspect of the present invention, includes directing energy from a heater onto a portion of the container to heat the portion while leaving the remainder of the container relatively unheated. The heated portion of the container is then engaged by a reforming tool to reform the respective portion of the container. The portion of the container may be, for example, the annular end sealing surface of the container neck finish. Heating and reforming the respective container portion in separate steps allows the heating step to be controlled by the intensity of the heat source and/or the dwell time of the container adjacent to the heater. The container portion can be heated with additional or more powerful heaters while not affecting the dwell time in contact with the reforming tool, thereby giving a greater level of process control. Moreover, employing an unheated reforming tool reduces the tendency of the heated portion to stick to the tool.

According to an exemplary embodiment of the method of the present invention, including at least one imprinted or embossed characteristic on the contact surface of the reforming tool creates a three-dimensional feature on the respective portion of the container, thus altering the aesthetic appearance of the container or providing a means by which to identify counterfeit containers employing the method and/or apparatus of the present invention. According to another exemplary embodiment of the present invention, including a transferable element on the contact surface of the reforming tool allows such element to be transferred to the respective portion of the container, thus adding to the aesthetic appearance of the container or providing a means by which to identify counterfeit containers employing the method of the present invention. The transferable element may be one of a decorative particle and/or a radio frequency identification (RFID) device. Where the transferable element is an RFID device, the present invention provides a means by which to track a container formed by the method and apparatus of the present invention.

An apparatus for reforming a portion of a blow molded plastic container in accordance with another aspect of the present invention includes a heater for focusing radiant heat energy onto a portion of the container to heat the portion while leaving the remainder of the container relatively unheated. A reforming tool is provided to contact and reform the portion of the container after heating by the heater. The reforming tool has a surface configured for engagement with the heated portion of the container. The portion of the container may be, for example, the annular end sealing surface of the container neck finish. Heating and reforming the respective container portion using a heater and a separate reforming tool allows the heating of the container portion to be controlled by the intensity of the heat source and/or the dwell time of the container adjacent to the heater. The container portion can be heated with additional or more powerful heaters while not affecting the dwell time in contact with the reforming tool, thereby giving a greater level of process control. Moreover, employing an unheated reforming tool reduces the tendency of the heated portion to stick to the tool.

According to an exemplary embodiment of the present invention, the contact surface of the reforming tool includes at least one imprinted or embossed characteristic thereon to create a three-dimensional feature on the respective portion of the container upon contact therewith, thus providing a means by which to alter the aesthetic appearance of the container and/or identify counterfeit containers employing the method and/or apparatus of the present invention. According to another exemplary embodiment of the present invention, the contact surface of the reforming tool includes a transferable element thereon for being transferred to the respective portion of the container upon contact therewith, thus providing a means by which to alter the aesthetic appearance of the container and/or identify counterfeit containers employing the method of the present invention. The transferable element may be one of a decorative particle and/or a radio frequency identification (RFID) device. Where the transferable element is an RFID device, the present invention provides a means by which to track a container formed by the method and apparatus of the present invention.

An extrusion blow molded plastic container in accordance with a further aspect of the present invention is formed according to the method as described herein.

BRIEF DESCRIPTION OF THE DRAWINGS

The invention, together with additional features, advantages and aspects thereof, will be best understood from the following description, the appended claims and the accompanying drawings, in which:

DETAILED DESCRIPTION OF INVENTION

Figure 1:
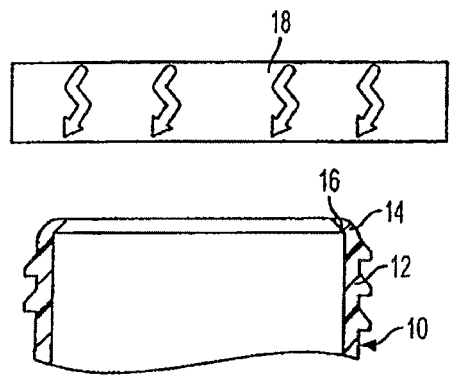
FIG. 1 is a schematic diagram depicting non-contact heating of the end portion of a container neck finish in accordance with an exemplary embodiment of the present invention.
Figure 2:
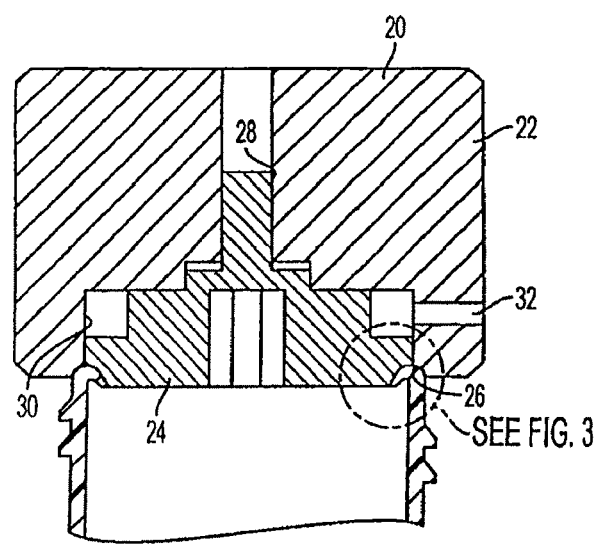
FIG. 2 is a schematic diagram depicting an unheated reforming tool contacting the heated container neck finish end portion in accordance with an exemplary embodiment of the present invention.
Figure 3:
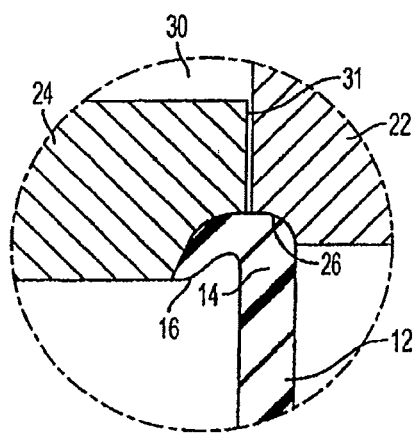
FIG. 3 is an enlarged detail view of the unheated reforming tool contacting the heated container neck finish end portion of FIG. 2.

FIGS. 1-3 illustrate a method and apparatus for reforming a portion of a plastic container such as, for example, the end sealing surface of a plastic container neck finish in accordance with an exemplary embodiment of the present invention. Referring to FIG. 1, a plastic container 10 includes a neck finish 12 with an end portion 14 that includes a radially inwardly and axially upwardly extending flange 16. (Directional words such as "upwardly" and "downwardly" are employed by way of description and not limitation with respect to the orientation of the apparatus and the containers illustrated in the drawings. Directional words such as "axial" and "radial" are employed by way of description and not limitation with respect to the axis of the container finish or the reforming tool as appropriate.) Flange 16 is typically formed by a trimming operation after extrusion blow molding, for example, in which container 10 is severed from a moil or the like. Flange 16, as initially formed, has a radially outwardly and axially upwardly facing surface that typically forms the end sealing surface of the neck finish.

In the method of the present invention, the neck finish 12 of plastic container 10 is positioned adjacent to a non-contact heater 18. The term "non-contact" means that the heating energy is transferred to neck finish 12 by radiation and/or convection heating, and not by physical contact with the neck finish (i.e., conduction heating). Heater 18 may be one of, for example, an infrared heater, a quartz lamp, a focused light or the like. Heater 18 is constructed to focus heat energy onto a portion of the container such as, for example, the neck finish end portion 14, to heat at least the end portion of the neck finish 12 to its softening temperature, while the remainder of the neck finish 12 (and indeed the remainder of the container 10) is substantially unheated by heater 18.

After heating neck finish end portion 14, a reforming tool head 20 is brought into contact with the end portion of the container neck finish, as shown in FIGS. 2 and 3. Reforming tool head 20, which is unheated, includes a first reforming tool member 22 having a second reforming tool member 24 removably received therein. In one exemplary embodiment of the present invention, adjacent end portions of first reforming tool member 22 and second reforming tool member 24 form a reforming contact surface such as, for example, an annular channel 26, for engagement with finish end portion 14. That is, after heating finish end portion 14 to its softening temperature, at least one portion of unheated reforming tool head 20 is brought into contact with the container neck finish 12 so that heated end portion 14 is engaged under pressure by the opposing surface of channel 26. The neck finish end portion is thereby reformed, cooled and solidified by the opposing surface of channel 26 so as to form a smooth neck finish end surface for sealing engagement with a closure or the like. In another exemplary embodiment, adjacent end portions of first and second reforming tool members 22, 24 may be configured for engagement with another portion of container 10.

The second reforming tool member 24 may be threadedly received within the first reforming tool member 22 in this embodiment so that the adjacent portions of channel 26 can be brought into alignment without having a shoulder or step in the channel surface between the first and second reforming tool members 22, 24. This threaded engagement is illustrated by reference numeral 28 in FIG. 2. A small radial gap 31 extends from channel 26 to pocket 30 between the second reforming tool member 24 and the first reforming tool member 22 as shown in FIG. 3. This gap 31 preferably is annular and of substantially uniform radial width, such as on the order of 0.001 inch. Gap 31 allows air to vent from the contact area of channel 26. Gap 31 also functions as a thermal barrier between second reforming tool member 24 and first reforming tool member 22. Pocket 30 is connected to the external atmosphere by one or more passages 32 to minimize heating of the first and second reforming tool members 22, 24 due to contact with the container neck finish end portion 14 during reforming, and to vent the air from gap 31.

FIGS. 1 and 4-7 illustrate a reforming apparatus and process in accordance with another exemplary embodiment of the invention. In FIGS. 4-7, the reforming tool head 34 includes a first reforming tool member 36 and a second reforming tool member 38. The first reforming tool member 36 and second reforming tool member 38 have opposed channel segments that together form an annular channel 40 for engaging and reforming the container neck finish end portion 14, as in the previous embodiment. As previously described, adjacent end portions of first and second reforming tool members 36, 38 may be configured for engagement with another portion of container 10. The second reforming tool member 38 is again threadedly positionable within the first reforming tool member 36 to bring the adjacent channel segments into smooth alignment to form annular channel 40, and air channels and passages 42, 44, 46, 48 are provided in the first and second reforming tool members 36, 38 to minimize heating of the surfaces that form forming channel 40 when contacting a heated portion of the container 10. An air vent gap 31, for example an annular, circumferentially continuous air vent gap of substantially uniform radial dimension, is formed between the outer periphery of the second reforming tool member 38 and the opposing inner surface of the first reforming tool member 36, both of which may be cylindrical.

Figure 4:
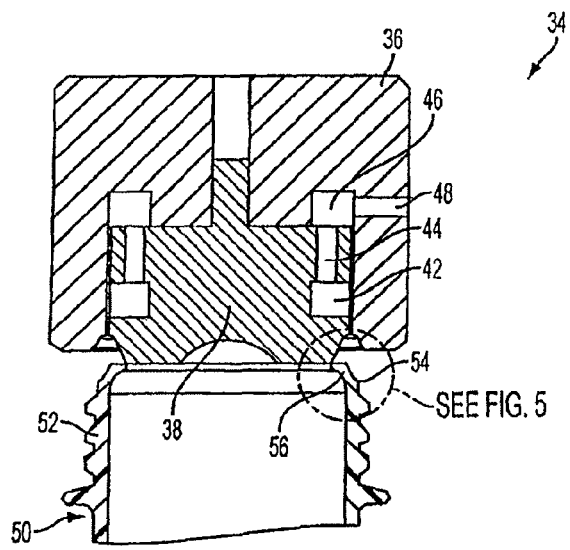
FIG. 4 is a fragmentary schematic diagram depicting a container neck finish end portion and an unheated reforming tool in accordance with a another exemplary embodiment of the present invention.
Figure 5:
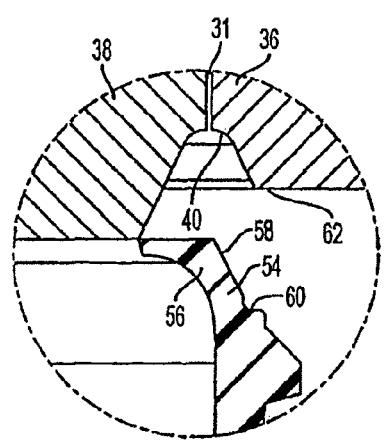
FIG. 5 is an enlarged detail view of the unheated reforming tool contacting the heated container neck finish end portion of FIG. 4.
Figure 6:
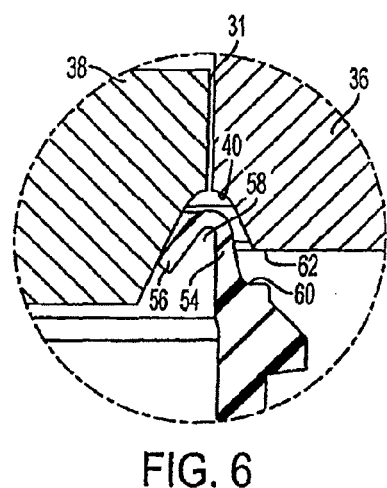
FIGS. 6 and 7 are enlarged detail views similar to that of FIG. 5 but which depict sequential process steps in accordance with the method of the present invention.
Figure 7:
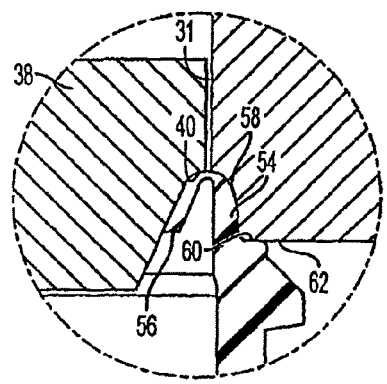

The container 50 illustrated in FIGS. 4-7 has a neck finish 52 with an end portion 54 and a radially inwardly and axially upwardly extending flange 56. Flange 56 is typically formed by a trimming operation after extrusion blow molding, for example, in which container 10 is severed from a moil or the like. As best seen in FIG. 5, flange 56 also has an external groove 58 that extends circumferentially around the flange, at about the mid portion of the flange, in a plane perpendicular to the axis of the neck finish. Groove 58 serves to localize bending of flange 56 during the reforming operation to the neck finish end portion 54 of the container 50, as shown in FIG. 7. Neck finish end portion 54 also has an axially facing external shoulder 60 in the embodiment of FIGS. 4-7. The axially facing external shoulder 60 is not heated by non-contact heater 18 and, thus, cooperates with an opposed axially facing shoulder 62 on the first reforming tool member 36 to limit axial motion of reforming tool head 34 with respect to container neck finish 52, as shown in FIG. 7. This limits and controls the bending of flange 56 and maintains dimensional tolerance stability during the reforming operation. As previously discussed, the axially facing external shoulder 60 of neck finish 52 is spaced sufficiently from flange 56 so as to not be heated substantially by the focused energy from heater 18 (FIG. 1), so that contact by tool shoulder 62 does not reform shoulder 60.

Figure 8:
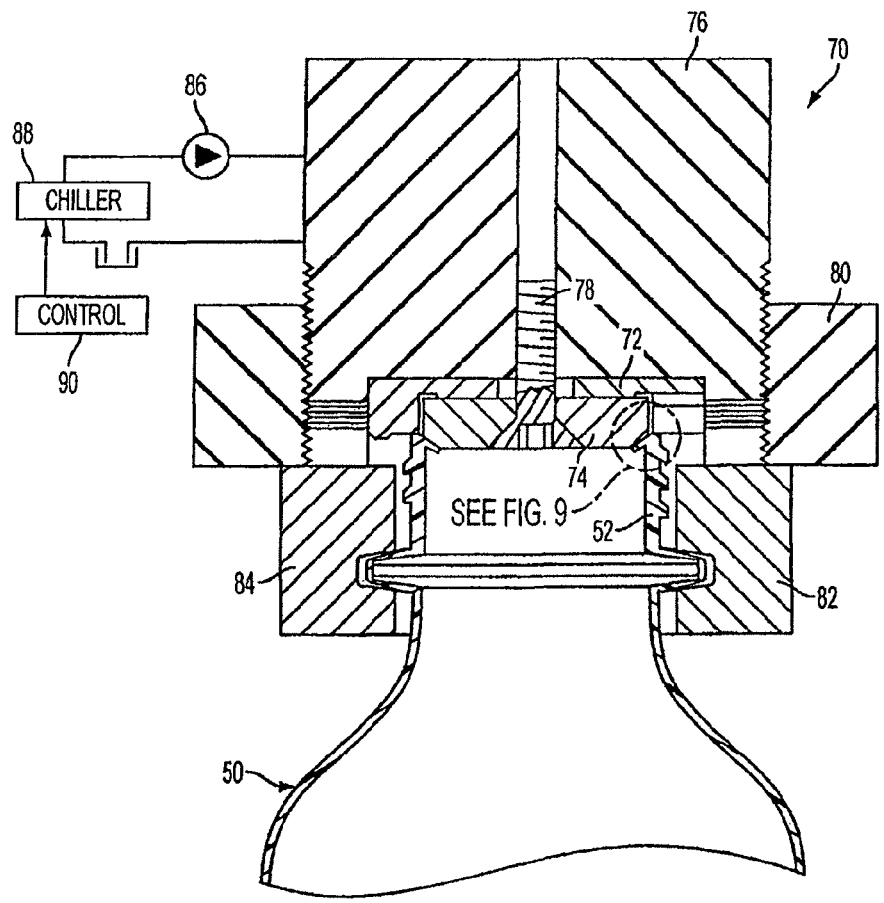
FIG. 8 is a schematic diagram depicting the unheated reforming tool in limited contact with the heated container neck finish end portion in accordance with a further embodiment of the present invention.
Figure 9:
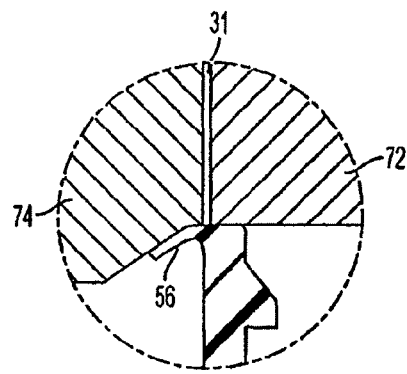
FIG. 9 is an enlarged detail view of the unheated reforming tool contacting the heated container neck finish end portion of FIG. 8.

FIGS. 8 and 9 illustrate a reforming tool head 70 in accordance with another exemplary embodiment of the invention. Reforming tool head 70 includes first and second reforming tool members 72, 74 that are threadedly mounted to a holder 76 by a fastener 78 such as, for example, a bolt or a screw. As previously discussed, an air vent gap 31 is formed between the outer periphery of the second reforming tool member 74 and the opposing inner surface of the first reforming tool member 72. A threaded collar 80 is adjustably and threadedly received on the holder 76. Collar 80 is adjusted on holder 76 to abut a pair of clamp arms 82, 84 that hold container 50 in position beneath reforming tool head 70. Thus, collar 80 cooperates with clamp arms 82, 84 to limit movement of the reforming tool head 70 with respect to the container 50, thereby controlling the bending of flange 56 without contacting a shoulder on container finish 52 as in the embodiment of FIGS. 4-7. FIG. 8 also illustrates cooling of reforming tool head 70 by means of a pump 86 that circulates a coolant, such as a water/glycol mixture, through a chiller 88. Chiller 88 has an associated control 90 for setting a desired coolant temperature.

Figure 11:
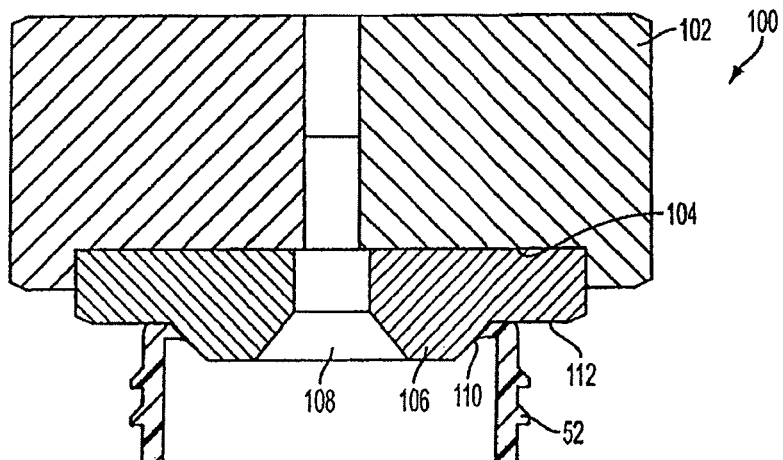
FIGS. 11 and 12 are schematic sectional views showing a further embodiment of the unheated reforming tool in contact with the heated container neck finish end portion.
Figure 12:
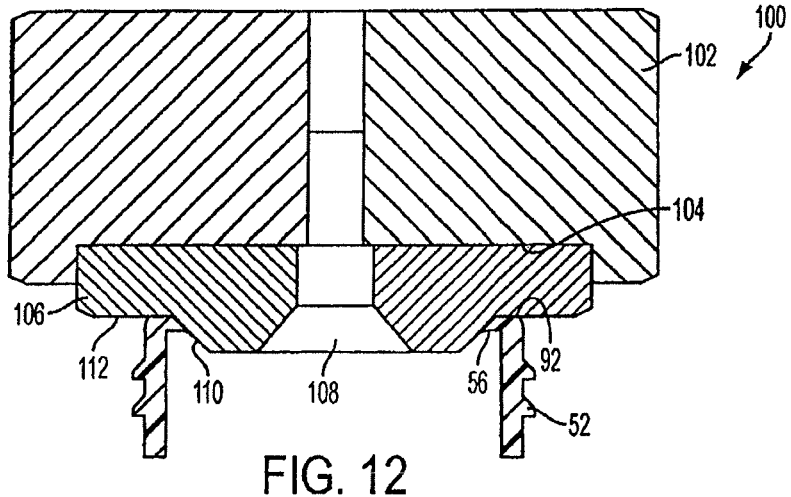

FIGS. 11-12 illustrate a reforming tool head 100 in accordance with a further embodiment of the invention. The reforming tool head 100 includes a first reforming tool member 102 having a pocket 104 within which a second reforming tool member 106 is mounted by a threaded fastener 108 such as, for example, a bolt or a screw. Second reforming tool member 106 has a conical external surface 110 circumferentially bounded by a peripheral flat surface 112 that faces the neck finish 52 of the container 50. When head 100 is brought into engagement with the container neck finish 52 (FIG. 12), the flange 56 is engaged by the conical surface 110 to reform the flange axially inwardly. The end surface 92 of the container neck finish 52 is engaged by the flat surface 112.

Figure 10:
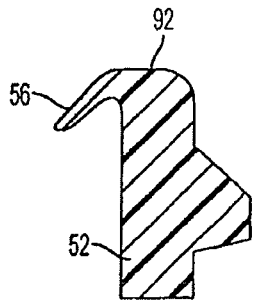
FIG. 10 is an enlarged sectional view of a reformed container neck finish.

In the four exemplary embodiments of the invention described thus far (FIGS. 1-3, FIGS. 1 and 4-7, FIGS. 1 and 8-9, and FIGS. 1 and 11-12), the neck finish end portion is first subjected to focused non-contact heating to heat at least the end surface of the neck finish end portion to its softening temperature while leaving the remainder of the neck finish substantially unheated. The heating of other portions of the container is also contemplated and description of the neck finish portion of the container is merely by example. After such non-contact heating, the neck finish end portion is then engaged by an unheated reforming tool so as to reform the heated and softened end portion of the neck finish. As noted above, the heating operation can be accomplished using various techniques, including an infrared lamp, radiant heater, quartz lamp, focused light energy, laser energy, a heated tool, etc. The unheated reforming tool may be at room temperature (ignoring the heating effects due to contact with the heated neck finish end portion), or may be cooled by circulation therethrough of a coolant fluid such as air or another media. The pressure applied by the reforming tool and the reforming tool contact time may be adjusted empirically to obtain the desired end surface reformation characteristics at the container neck finish end portion. The neck finish end portion takes the shape of the opposing surface(s) of the reforming tool, which leaves the neck finish end surface free of features that can deleteriously affect the ability to seal against the neck finish end surface, such as mold parting lines, mismatch seams, nicks and other manufacturing imperfections created, for example, in the production and trimming process. The neck finish 52 in FIG. 10 has an end surface that is planar, and a flange 56 (or flange 16 in FIGS. 1-3) that extends radially inwardly and axially downwardly from the end surface. Flange 56 is circumferentially continuous.

The container of the present invention can be of monolayer plastic construction, or can be of multilayer plastic construction in which intermediate layers may or may not extend into the neck finish end portion of the container. At least the end surface of the container neck finish end portion is heated by a non-contact heat source to a temperature at which the plastic is soft and suitable for reforming. For polypropylene, it has been found that the reforming temperature can be in the range of, for example, about 220 to 320° F., more preferably about 275 to 315° F., and most preferably about 300° F. The forming surface of the unheated reforming tool is maintained at a temperature of not more than about 100° F. In an implementation of the embodiment of FIGS. 8-9, chiller 88 is controlled to maintain a temperature of about 60° F. at reforming head 70. The heated container neck finish is engaged by the reforming tool for about three seconds or less after heating. That is, the reforming tool dwell time is preferably three seconds or less.

The various embodiments of the process and apparatus described above provide an effective and efficient way in which respective portions of a container can be reformed to substantially eliminate manufacturing imperfections thereon. The present reforming process and apparatus also produce a very high quality surface finish on the reformed portion of the plastic container which is not believed to be reproducible without using the process and apparatus of the present invention. The surface finish produced by the present reforming operation is of such high quality that even fingerprints present on the contact surface of the reforming tool head are transferred onto the surface of the reformed portion of the container. Thus, the method and apparatus of the present invention can be used to uniquely and distinctively label or mark a portion of a container subject to the reforming process and apparatus with features that would be difficult to duplicate without using the present invention. This marking may serve several purposes, including but not limited to, distinctively labeling containers for aesthetic purposes, tracking purposes, and/or detecting counterfeit or copy-cat containers employing the same reforming method and apparatus to improve container appearance.

Figure 13:
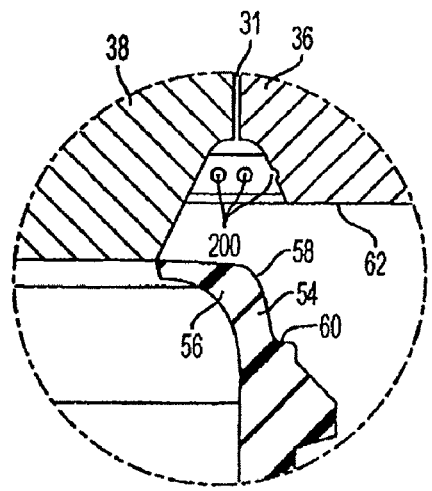
FIG. 13 is a sectional side view of the contact surface of the reforming tool showing an exemplary imprinted characteristic thereon.

FIG. 13 depicts the contact surface of first reforming tool member 36 of FIG. 4 including an exemplary imprinted characteristic 200 thereon such as, for example, a design, a pattern, a series of letters, or a series of numbers. The imprinted characteristic 200 may be formed on the contact surface of the first reforming tool member 36 by various methods such as, for example, during molding or casting of the first reforming tool member 36 or by mechanical or laser etching techniques. The imprinted characteristic 200 may also be formed on other reforming tool contact surfaces. Reference to the reforming tool head 34 and first reforming tool member 36 is only by way of example and not meant to limit the tool contact surfaces which can include the imprinted characteristic 200. Referring to FIG. 13, the contact surface of the first reforming tool member 36, for example, the annular channel 40 discussed above, also includes at least one imprinted characteristic 200 thereon such that when the first reforming tool member 36 engages the heated portion of the container 50, the at least one imprinted characteristic 200 on the contact surface of the first reforming tool member 36 forms a three-dimensional feature 201 on the respective reformed portion of the container 50 (see FIG. 14).

Figure 15:
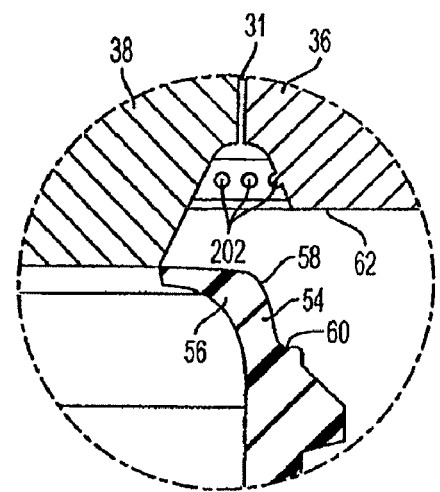
FIG. 15 is a sectional side view of the contact surface of the reforming tool showing an exemplary embossed characteristic thereon.

FIG. 15 depicts a contact surface of first reforming tool member 36 including an exemplary embossed characteristic 202 thereon such as, for example, a design, a pattern, a series of letters, or a series of numbers. The embossed characteristic 202 may be formed on the contact surface of the first reforming tool member 36 by various methods such as, for example, during molding or casting of the first reforming tool member 36 or by mechanical or laser etching techniques. The embossed characteristic 202 may also be formed on other reforming tool contact surfaces. Reference to the reforming tool 34 and first reforming tool member 36 is only by way of example and not meant to limit the tool contact surfaces which can include the embossed characteristic 202. Referring to FIG. 15, the contact surface of the first reforming tool member 36, for example, the annular channel 40 discussed above, also includes at least one embossed characteristic 202 thereon such that when the first reforming tool member 36 engages the heated portion of the container 50, the at least one embossed characteristic 202 on the contact surface of the first reforming tool member 36 forms a three-dimensional feature 203 on the respective portion of the container 50 (see FIG. 16).

Figure 14:
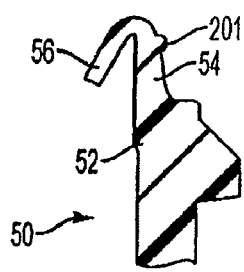
FIG. 14 is a sectional side view of the container neck finish end portion after contact with the contact surface of the reforming tool as shown in FIG. 13.
Figure 16:
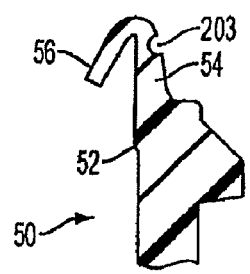
FIG. 16 is a sectional side view of the container neck finish end portion after contact with the contact surface of the reforming tool as shown in FIG. 15.

As depicted in FIGS. 14 and 16, the three-dimensional feature formed on the respective portion of the container 50 can alter the aesthetic appearance of the container 50 and can provide a means by which to identify counterfeit containers employing the method and/or apparatus of the present invention. For example, if the at least one imprinted characteristic 200 on the contact surface of the first reforming tool member 36 is imprinted or recessed thereon (FIG. 13), the mirrored three-dimensional feature 201 formed on the respective portion of the container 50 will be an embossed or raised feature as shown in FIG. 14. In contrast, if the at least one embossed characteristic 202 on the contact surface of the first reforming tool member 36 is embossed thereon (i.e., raised) (FIG. 15), the three-dimensional feature 203 formed on the respective portion of the container 50 will be an imprinted or recessed feature as shown in FIG. 16.

Figure 17:
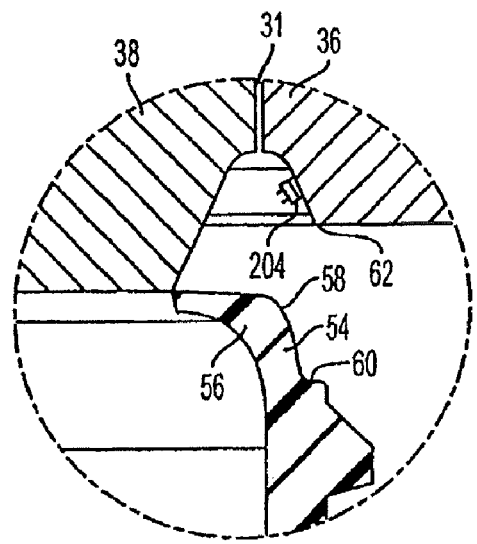
FIG. 17 is a sectional side view of the contact surface of the reforming tool showing an exemplary transferable element thereon.
Figure 18:
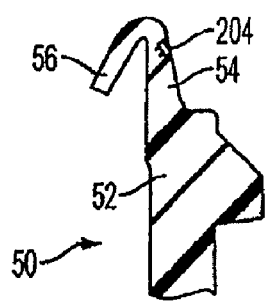
FIG. 18 is a sectional side view of the container neck finish end portion after contact with the contact surface of the reforming tool having at least one exemplary transferable element thereon as shown in FIG. 17.

FIGS. 17-20 depict another exemplary embodiment according to the present invention wherein a transferable element 204 or 205 is transferred from the contact surface of the first reforming tool member 36 to the portion of the container 50 during reforming. The transferable element 204 or 205 may be placed on, or otherwise attached to, the contact surface of the first reforming tool member 36 by any known manual or automatic means which would be apparent to one having ordinary skill in the art. The transferable element 204 or 205 may also be formed on other reforming tool contact surfaces. Reference to the reforming tool head 34 and first reforming tool member 36 is only by way of example and not meant to limit the tool contact surfaces which can include the transferable element 204 or 205. Specifically, FIG. 17 depicts the contact surface of the first reforming tool member 36 including an exemplary transferable element 204 thereon. The transferable element 204 may be, for, example, an RFID device for transferring or implanting into the portion of the container 50 upon contact therewith (FIG. 18). Once transferred, the RFID device 204 can serve to track the individual container during processing, shipping, etc.

Figure 19:
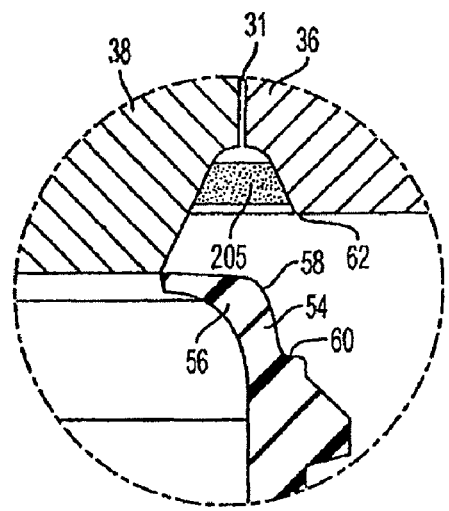
FIG. 19 is a sectional side view of the contact surface of the reforming tool showing another exemplary transferable element thereon.
Figure 20:
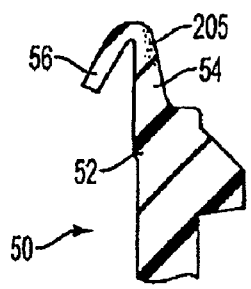
FIG. 20 is a sectional side view of the container neck finish end portion after contact with the contact surface of the reforming tool having at least one exemplary transferable element thereon as shown in FIG. 19.

Alternatively, FIG. 19 depicts the contact surface of the first reforming tool member 36 including a transferable element 205 thereon for transferring to the portion of the container 50 during reforming. The transferable element 205 may be, for example, at least one decorative particle 205 such as, for example, glitter, for transferring onto or implanting into the portion of the container 50 upon contact with the contact surface of the first reforming tool member 36 (FIG. 20). Once transferred, the decorative particle 205 can serve to add a unique aesthetic appeal to the portion of the container 50 as well as provide a means by which to identify counterfeit containers employing the method and/or apparatus of the present invention.

There have thus been disclosed a method and an apparatus for reforming a portion of a plastic container such as, for example, a neck finish end surface of the container, and a container having a reformed neck finish end surface. The invention has been disclosed in conjunction with various exemplary embodiments thereof, and a number of modifications and variations have been discussed. Other modifications and variations will readily suggest themselves to persons of ordinary skill in the art. Although the invention has been disclosed in conjunction with reforming the trimmed end of an extrusion blow molded container neck finish, the invention in its broadest aspects can be applied to other portions of a container. For example, the invention in its broadest aspects can be implemented in conjunction with portions of injection or compression molded containers such as neck finishes thereon and/or on portions of containers made in a reheat blow molding operation or an injection/extrusion/blow molding operation. The invention is intended to embrace these and all other modifications and variations that fall within the spirit and broad scope of the appended claims.

The invention claimed is:

1. A method of reforming a portion of a plastic container, comprising:
  providing a previously formed and cooled plastic container having a smaller upper portion and a larger remainder;
  directing energy from a heater onto only the upper portion of the container to heat the upper portion, the remainder of the container remaining relatively unheated;
  contacting the upper portion of the container with a contact surface of first and second reforming tools, the contact surface having at least one embossed or imprinted characteristic or at least one transferable element and the first and second reforming tools being spaced apart from the heater and defining a cavity receiving the upper portion of the container after the upper portion has been heated;
  only the heated upper portion between the first and second reforming tools to eliminate manufacturing imperfections on the upper portion of the container, to reform the upper portion of the container, and to transfer to the upper portion of the container the at least one embossed or imprinted characteristic or at least one transferable element; and
  removing the reforming tools from the upper portion of the container, wherein manufacturing imperfections have been eliminated from the upper portion of the container, the upper portion of the container has been reformed, and the upper portion of the container includes the at least one embossed or imprinted characteristic or at least one transferable element.

2. The method set forth in claim 1, wherein the energy from the heater heats the upper portion of the container to its softening temperature.

3. The method set forth in claim 1, wherein the heater is a non-contact heater such that the heater heats the upper portion of the container via one or both of radiation and convection heating, and not by physical contact with the upper portion.

4. The method set forth in claim 1, wherein the reforming tools are substantially unheated to simultaneously reform and cool the upper portion of the container upon contact.

5. The method set forth in claim 1, wherein the at least one transferable element is a design, a pattern, a series of letters, or a series of numbers.

6. The method set forth in claim 1, wherein the upper portion of the container is a neck finish end portion.

7. The method set forth in claim 1, wherein the at least one transferable element is a radio frequency identification device.

8. The method set forth in claim 1, wherein the at least one transferable element is a decorative particle.

9. The method set forth in claim 1, further comprising the step of controlling the intensity of the heater.

10. The method set forth in claim 1, further comprising the step of controlling the dwell time of the container adjacent to the heater.

11. The method set forth in claim 7, further comprising the step of tracking the container having the radio frequency identification device.

12. The method set forth in claim 1, further comprising the step of providing an air gap extending from the contact surface to vent air from between the contact surface and the upper portion of the container.

13. The method set forth in claim 1, further comprising the step of providing a chiller coupled to the reforming tools for cooling the contact surface of the reforming tools.

14. The method set forth in claim 13, further comprising the step of providing a pump for circulating liquid coolant through the reforming tools.

15. The method set forth in claim 3, further comprising the step of providing a heater selected from the group consisting of an infrared lamp, a radiant heater, a quartz lamp, focused light energy, laser energy, and a heated tool.

16. A method of reforming a portion of a plastic container, comprising:

providing a previously formed and cooled plastic container having a smaller upper portion and a larger remainder;

directing energy from a heater onto only the upper portion of the container to heat the upper portion, the remainder of the container remaining relatively unheated;

contacting the upper portion of the container with a contact surface of first and second reforming tools, the contact surface having at least one embossed or imprinted characteristic or at least one transferable element and the first and second reforming tools being spaced apart from the heater and defining a cavity receiving the upper portion of the container after the upper portion has been heated;

cooling the contact surface of the reforming tools;

compressing only the heated upper portion between the first and second reforming tools to eliminate manufacturing imperfections on the upper portion of the container, to reform the upper portion of the container, and to transfer to the upper portion of the container the at least one embossed or imprinted characteristic or at least one transferable element;

venting air from between the contact surface and the upper portion of the container via an air gap extending from the contact surface; and removing the reforming tools from the upper portion of the container, wherein manufacturing imperfections have been eliminated from the upper portion of the container, the upper portion of the container has been reformed, and the upper portion of the container includes the at least one embossed or imprinted characteristic or at least one transferable element.

17. A method of reforming a portion of a plastic container, comprising:

providing a previously formed and cooled plastic container having a smaller upper portion and a larger remainder;

directing energy from a heater onto only the upper portion of the container to heat the upper portion, the remainder of the container remaining relatively unheated;

contacting the upper portion of the container with a contact surface of first and second reforming tools, the contact surface having at least one embossed or imprinted characteristic or at least one transferable element and the first and second reforming tools being spaced apart from the heater and defining a cavity receiving the upper portion of the container after the upper portion has been heated;

cooling the contact surface of the reforming tools using a chiller reducing the temperature of a coolant and a pump circulating the coolant through the chiller and to the reforming tools;

controlling the coolant temperature;

compressing only the heated upper portion between the first and second reforming tools to eliminate manufacturing imperfections on the upper portion of the container, to reform the upper portion of the container, and to transfer to the upper portion of the container the at least one embossed or imprinted characteristic or at least one transferable element;

venting air from between the contact surface and the upper portion of the container via an air gap extending from the contact surface; and removing the reforming tools from the upper portion of the container, wherein manufacturing imperfections have been eliminated from the upper portion of the container, the upper portion of the container has been reformed, and the upper portion of the container includes the at least one embossed or imprinted characteristic or at least one transferable element.

* * * * *

UNITED STATES PATENT AND TRADEMARK OFFICE
CERTIFICATE OF CORRECTION

Page 1 of 1

PATENT NO. : 8,257,636 B2
APPLICATION NO. : 12/556709
DATED : September 4, 2012
INVENTOR(S) : Oconnell et al.

It is certified that error appears in the above-identified patent and that said Letters Patent is hereby corrected as shown below:

Cover Page, Item (73) should read:

(73) Assignee: Graham Packaging Company, L.P.,
York, PA (US)

Signed and Sealed this
Eleventh Day of December, 2012

David J. Kappos
*Director of the United States Patent and Trademark Office*